(12) United States Patent
Fresnel (10) Patent No.: US 9,434,104 B2
(45) Date of Patent: Sep. 6, 2016

(54) HEAT-SHRINKING FACILITY INCLUDING HEAT-DIFFUSION MEANS FORMING A SINGLE UNIT

(75) Inventor: Eric Fresnel, Paris (FR)

(73) Assignee: Sleever International Company, Morangis (FR)

( * ) Notice: Subject to any disclaimer, the term of this patent is extended or adjusted under 35 U.S.C. 154(b) by 781 days.

(21) Appl. No.: 13/547,356

(22) Filed: Jul. 12, 2012

(65) Prior Publication Data

US 2014/0014273 A1   Jan. 16, 2014

(51) Int. Cl.
*B32B 37/00*   (2006.01)
*B29C 61/00*   (2006.01)
*B29C 63/42*   (2006.01)

(52) U.S. Cl.
CPC ............. *B29C 61/00* (2013.01); *B29C 63/423* (2013.01)

(58) Field of Classification Search
CPC .... B29C 61/00; B29C 63/423; B65B 53/063
USPC ............. 156/84, 85, 86, 359, 499, 538, 556; 53/442, 557
See application file for complete search history.

(56) References Cited

U.S. PATENT DOCUMENTS

| | | | |
|---|---|---|---|
| 4,738,082 A | 4/1988 | Saitoh | |
| 7,811,084 B2* | 10/2010 | Huang | 432/144 |
| 8,196,376 B2* | 6/2012 | Uetsuki et al. | 53/557 |
| 2009/0188605 A1* | 7/2009 | Huang | 156/84 |
| 2010/0032077 A1* | 2/2010 | Uetsuki et al. | 156/86 |
| 2012/0261028 A1* | 10/2012 | Gray | B01F 3/04446 141/9 |
| 2014/0014272 A1 | 1/2014 | Fresnel | |
| 2014/0017623 A1 | 1/2014 | Fresnel | |

* cited by examiner

*Primary Examiner* — James Sells
(74) *Attorney, Agent, or Firm* — McCormick, Paulding & Huber LLP (57) ABSTRACT

The invention relates to a heat-shrinking facility for heat-shrinking sleeves made of heat-shrinkable material inserted onto supports comprising an enclosure, a heat-diffusion means arranged inside the enclosure, at least one conveyor for carrying the supports through the enclosure between an intake of the enclosure and an output of the enclosure. According to the invention, the heat-diffusion means form a single unit removably mounted on the base of the enclosure, with the heat-diffusion means including a means for quick connection to a heat-generation means leading into the enclosure.

16 Claims, 8 Drawing Sheets

HEAT-SHRINKING FACILITY INCLUDING HEAT-DIFFUSION MEANS FORMING A SINGLE UNIT

FIELD OF THE INVENTION

The invention relates to a facility for heat-shrinking sleeves made of a heat-shrinkable material inserted onto supports such as containers.

BACKGROUND OF THE INVENTION

In the field of heat-shrinking, facilities are known for heat-shrinking sleeves made of heat-shrinkable material inserted onto supports such as containers, comprising an enclosure provided with a heat-diffusion means inside the enclosure and a conveyor for carrying the supports through the enclosure between an intake of the enclosure and an output of the enclosure.

As the support is carried through the enclosure, by exposure to the heat induced by the heat-diffusion means, the sleeve softens and then shrinks onto the support.

The heat-diffusion means can also include, for instance, a means for heating by steam which includes steam diffusers attached to the side walls of the enclosure, the steam diffusers being connected to a steam-intake opening arranged in the enclosure.

SUMMARY OF THE INVENTION

One aim of the invention is to propose a heat-shrinking facility the maintenance and implementation of which are made easier.

In order to achieve this aim, we propose a facility for heat-shrinking sleeves made of heat-shrinkable material inserted onto supports such as containers, comprising an enclosure provided with an enclosure, a heat-diffusion means arranged inside the enclosure and at least a conveyor for carrying the supports through the enclosure between an intake of the enclosure and an output of the enclosure.

According to the invention, the heat-diffusion means form a single unit removably mounted on the base of the enclosure, with the heat-diffusion means including a means for quick connection to a heat-generation means leading into the enclosure.

The steam-diffusion means is thus totally independent of the enclosure except for the connection to the heat-generation means, whereas, in the prior art, the heat-diffusion means is secured to the walls of the enclosure. It is therefore much simpler to have access to the heat-diffusion means and more particularly to have access to a specific area of said heat-diffusion means.

The steam-diffusion means is particularly light and compact. It is therefore possible to manufacture heat-diffusion means weighing no more than around ten kilograms.

It is thus very easy to change the heat-diffusion means simply by removing and raising the single unit, for instance, when the heat-diffusion means is defective. The facility according to the invention is therefore particularly modular. Moreover, when changing the supports to be carried through the enclosure, it is easy to replace the heat-diffusion means provided in the enclosure with another heat-diffusion means also forming a modular unit mounted on the base of the enclosure, better suited for heat-shrinking sleeves onto the new supports.

According to a specific embodiment, the heat-diffusion means is a means for heating by steam which comprises a quick-connection means which is capable of sealingly engaging with at least one steam-intake opening being arranged in the enclosure.

According to one aspect of the invention, the heating means is attached on the base by the quick-connection means only.

According to a specific embodiment, the heating means includes a framework which supports the quick-connection means, and steam-diffusion means which includes at least one diffuser which is removably and adjustably secured to the framework and which is connected to the steam-intake opening by the quick-connection means.

According to one aspect of the invention, the diffuser comprises a manifold pierced with openings for diffusing steam, the manifold being secured to the framework such as to extend substantially along the conveyor, and a pipe for carrying steam connected by one end to the manifold and by the other end to the quick-connection means.

According to a specific embodiment, the manifold and the steam carrying pipe are, for example, made of a composite or plastic material.

According to one aspect of the invention, the quick-connection means comprises at least one distribution housing which is connected to the steam-intake opening, the steam-diffusion means comprises several diffusers which are all connected to the same distribution housing to be connected to the steam-intake opening.

According to one specific embodiment, the diffusers are all connected independently from one another to the housing, the housing includes respective flow rate adjusting means supplied for each diffuser.

According to one aspect of the invention, the adjustment means herein comprises screw-needle assemblies each associated with one of the steam-distribution openings of the housing to which one of the manifolds is connected, each needle having a rounded profile and being movable by the associated screw in order to obstruct all or part of the associated distribution opening.

According to a specific embodiment, the steam-diffusion means comprises a first series of diffusers which are secured to the framework such that said diffusers all extend substantially along a first side of the conveyor and a second series of diffusers which are secured to the framework such that said diffusers all extend substantially along a second side of the conveyor opposite the first side.

According to one embodiment, the framework comprises two elements including a means for provisionally securing said elements together, the first element supporting the first series of diffusers and the second element supporting the second series of diffusers.

According to one particular embodiment, the connection means comprises two distribution housings connected to distinct steam-intake openings, with the two housings being placed on either side of the conveyor so that the diffusers of the first series can all be connected to one of the openings through one of the housings and so that the diffusers of the second series can all be connected to the other opening through the other housing.

According to one aspect of the invention, the frame includes two side rails each one extending along a different side of the conveyor and at least two arches, with each one being secured on each side rail so that the arches extend above the conveyor, with the diffuser being secured on one of the arches.

According to a particular embodiment, the base of the enclosure includes feet for receiving the frame side rails, with the feet being placed on either side of the conveyor.

According to one aspect of the invention, the facility comprises a heat-generation means connected to the heat-diffusion means and a frame supporting the base, in which said heat-generation means is at least partially arranged, the facility also comprising a means for drying a return arm of the conveyor by hot air, said drying means being connected to an air-extraction means in the frame.

According to a particular embodiment, the enclosure including a hood which is mounted mobile between an open position allowing access to the conveyor and an operational position in which it is securely mounted on the base, the hood comprising two openings through which the conveyor extends when the hood is in operational position and comprising an inner partition mounted mobile between a retracted position and a service position in which the partition defines with side walls of the hood and the base a main chamber of the enclosure subjected to the action of the heat-diffusion means when the hood is in operational position, with the service position of the partition being defined by abutment of the partition against the heat-diffusion means.

BRIEF DESCRIPTION OF THE DRAWINGS

The invention will be better understood in the light of the following description, made in reference to the figures of the attached drawings, in which.

DETAILED DESCRIPTION OF THE INVENTION

The facility described herein is intended for heat-shrinking sleeves made of a heat-shrinkable material inserted onto supports, such as containers. The facility is, for example, arranged between a facility for cutting and installing sleeves made of heat-shrinkable material on supports and a support-filling facility.

In reference to FIGS. 1, 2, 4 and 6, the heat-shrinking facility according to the invention comprises an enclosure 1 which is provided with a heat-diffusion means, in this case a means for heating by water steam 100, and a conveyor 2 for carrying the supports through the enclosure 1 between an intake of the enclosure 1 and an output of the enclosure 1 in the direction shown by the arrows. The facility also comprises a means for generating water steam 200 for supplying steam to the heating means 100 as shown more clearly in FIG. 7.

According to a specific embodiment, the facility comprises a frame 6 which supports the enclosure 1 and in which the means for generating water steam 200 is at least partially arranged. The facility herein also comprises a means for drying a return arm of the conveyor 2 by hot air, the drying means being connected to an air-extraction means in the frame 6.

Indeed, the means for generating water steam 200 considerably heats the inside of the frame 6. Thus, instead of generating hot air for drying the return arm of the conveyor 2, the hot air is collected directly from the frame 6, thus reducing the power consumption of the drying means. Moreover, this makes it possible to evacuate part of the hot air in the frame 6 and thus to reduce overheating inside the frame 6.

The enclosure and the means for generating water steam 200 will be described in greater detail below. The means for heating by water steam 100 will first be described.

Figure 2:
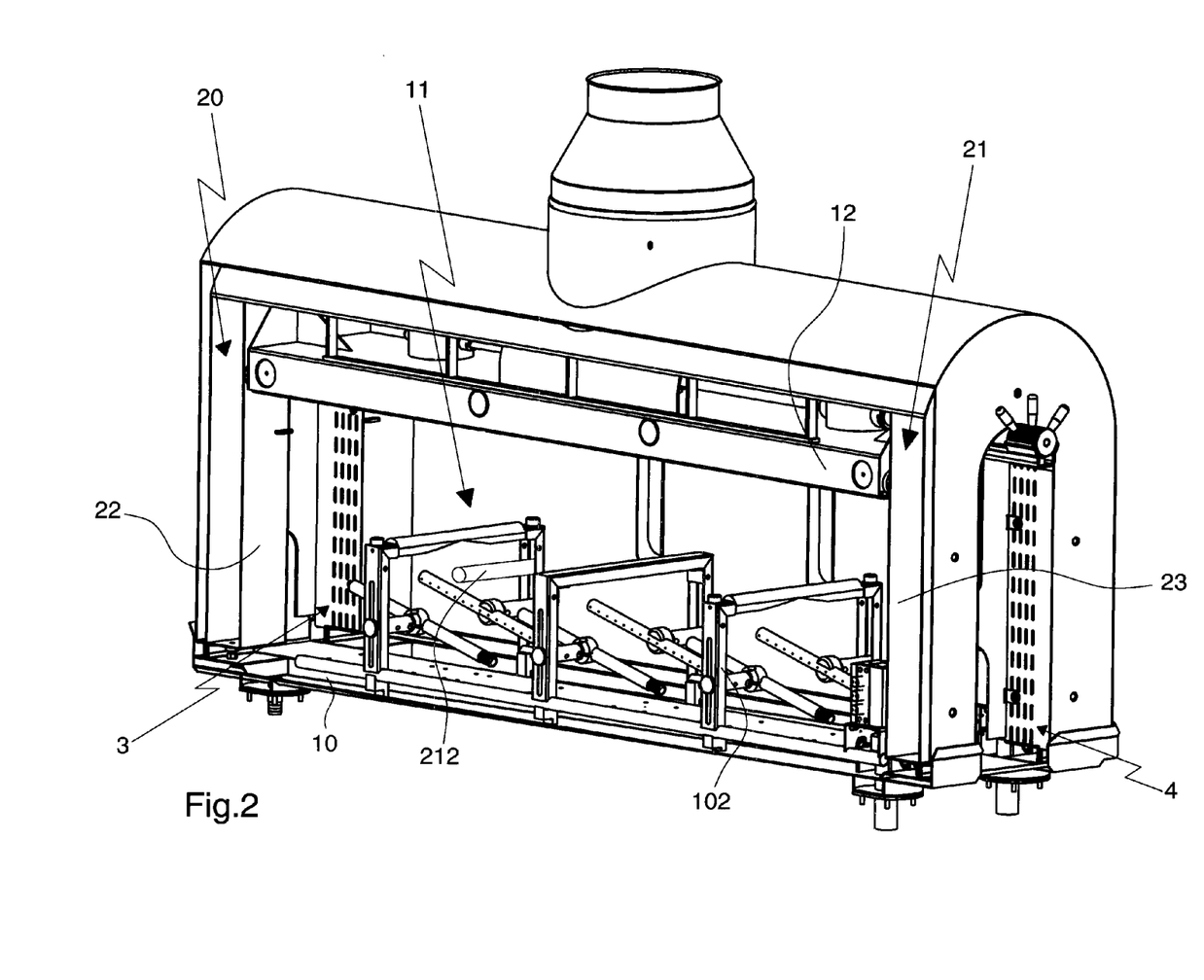
FIG. 2 is a schematic perspective view of a part of the heat-shrinking facility depicted in FIG. 1, with the side walls of one side of the heat-shrinking facility not shown.
Figure 4:
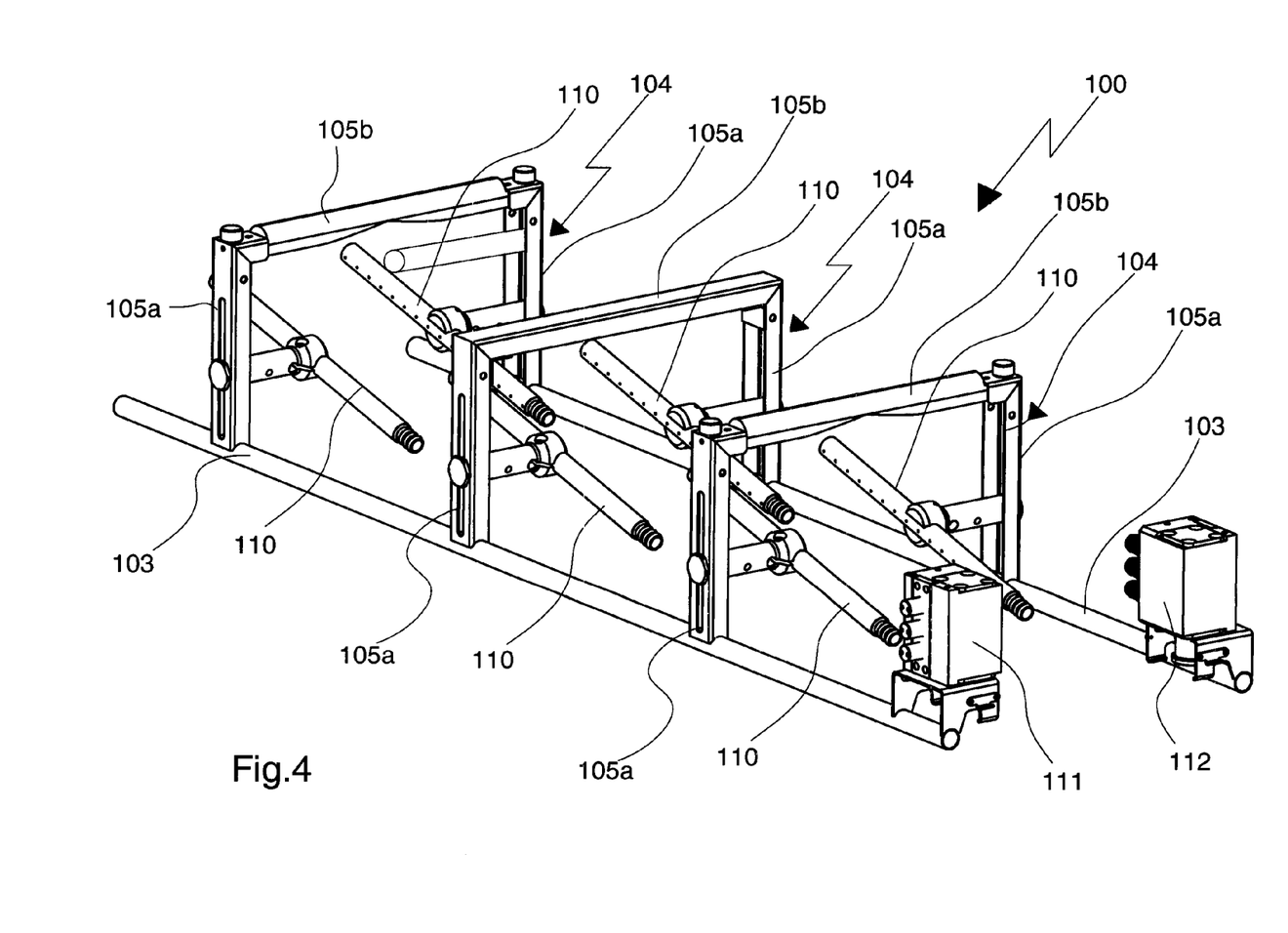
FIG. 4 is a perspective view of a heat-diffusion means of the heat-shrinking facility depicted in FIG. 1.
Figure 5:
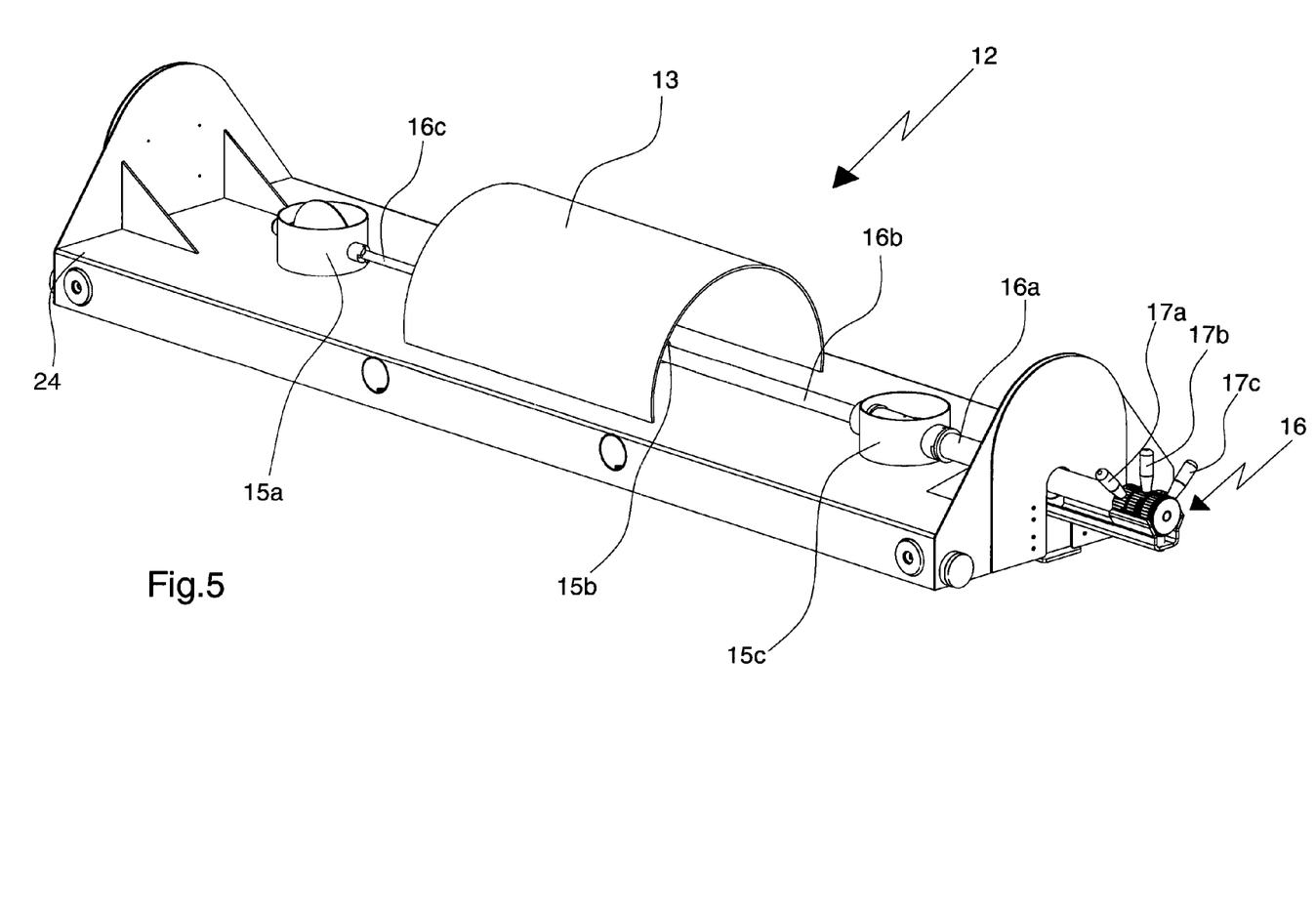
FIG. 5 is a perspective view of an inner partition of the hood depicted in FIG. 1.

Referring to FIGS. 2, 4 and 5, the heating means 100 are supported by the base 10 of the enclosure 1. Evidently, base is understood to refer to a base 10 which is substantially parallel to the ground on which the facility rests.

The means for heating by steam 100 herein comprises a means for diffusing steam and a quick-connection means which is capable of sealingly engaging with a first steam-intake opening 101*a* and a second steam-intake opening 101*b*, the two steam-intake openings being arranged in the enclosure such as to be placed on either side of the conveyor 2.

According to the invention, the means for heating by water steam 100 forms a single unit removably mounted on the base 10.

Thus, it is very easy to change the means for heating by water steam 100 simply by removing and raising the single unit. The facility according to the invention is therefore particularly modular. Moreover, when changing the supports to be carried through the enclosure 1, it is easy to replace the means for heating by water steam 100 in the enclosure 1 with another means for heating by water steam 100, also forming a modular unit mounted on the base of the enclosure, better suited for heat-shrinking sleeves onto the new supports.

Quick-connection means is obviously understood to relate to a means that makes it possible directly to remove the single unit from the base 10 simply by raising the single unit, such as a means for connection by snap-fitting or else a means requiring one or more very straightforward removal steps involving a standard tool, such as a screwdriver, before being able to raise the single unit.

According to a specific embodiment, the means for heating by steam 100 comprises a framework 102 which supports the quick-connection means and the steam-diffusion means. Thus, the framework 102 comprises two side rails 103 each extending along a different side of the conveyor 2 and three arches 104 each secured to each side rail 103 such that the arches 104 extend over the conveyor 2. The arches 104 are arranged herein at regular intervals on the side rails 103. Each arch 104 herein comprises two uprights 105*a* which extend, parallel to one another, perpendicular to the base 10 when the framework 102 is mounted on the base 10. One end of each upright 105*a* is connected to one of the side rails and the other end is free. Each arch 104 also comprises a cross rail 105*b* connecting the free ends of the two uprights 105*a*.

The steam-diffusion means herein is only attached to the base 10 by the quick-connection means.

Figure 3:
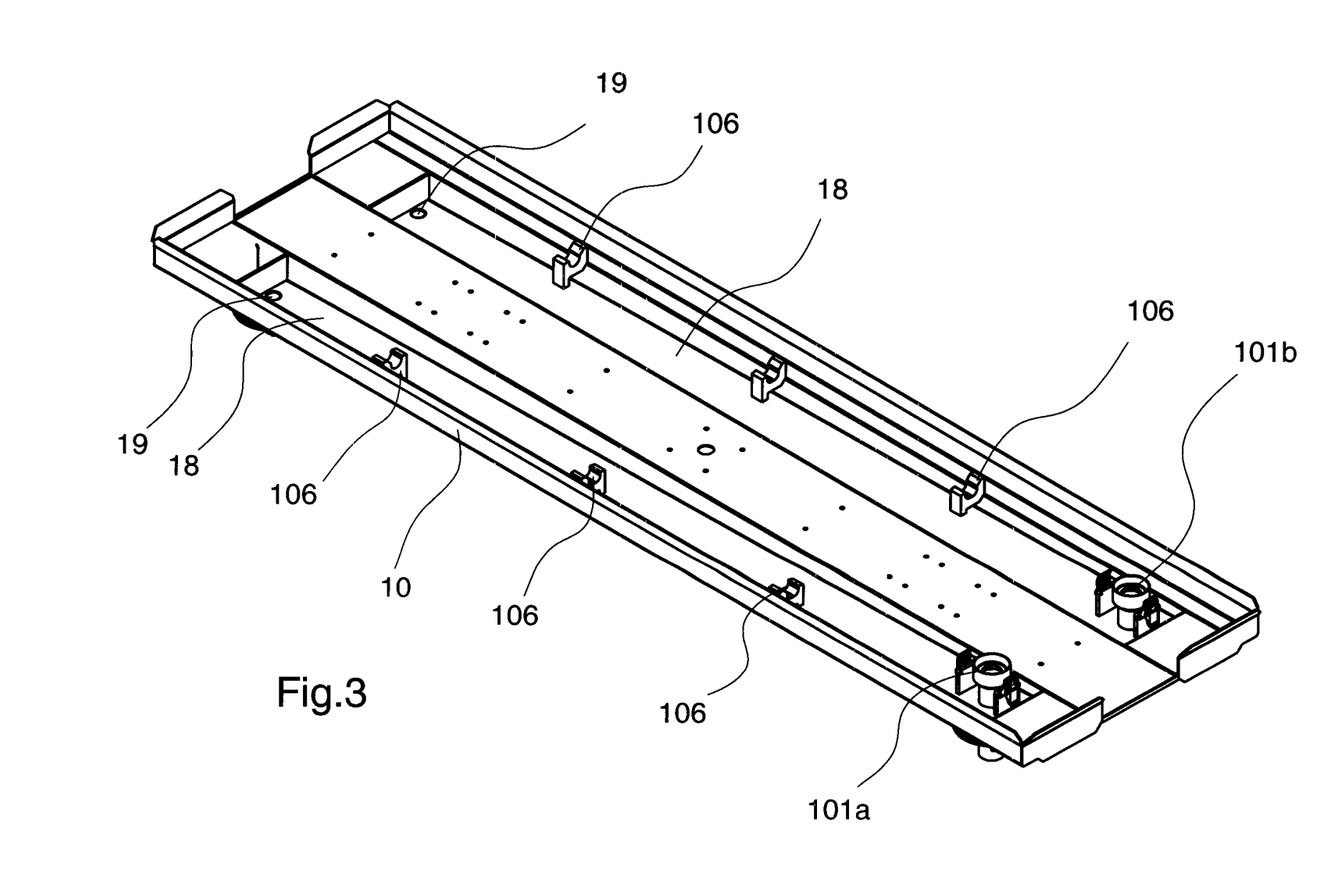
FIG. 3 is a perspective view of a base of the enclosure of the heat-shrinking facility depicted in FIG. 1.

For this purpose, as can be seen more clearly in FIG. 3, the base 10 herein comprises holding feet 106 which are placed on either side of the conveyor 2. The holding feet 106 hold the side rails 103 of the framework 102 when the latter is mounted on the base 10. The framework 102 is therefore only attached to the base 10 by the connection means, and the holding feet 106 help stabilise the framework 102 on the base 10. The holding feet 106 herein are arranged at regular intervals on the base 10.

According to a specific embodiment, the steam-diffusion means comprises a first series of diffusers which are secured to the framework 102 such that said diffusers extend substantially along a first side of the conveyor 2 and a second series of diffusers which are secured to the framework 102 such that said diffusers extend substantially along a second side of the conveyor 2 opposite the first side.

The diffusers therefore extend along the conveyor 2 substantially along the entire length of the conveyor 2 and on either side of the conveyor 2, which makes it possible to diffuse the steam on the sleeves along the entire length over which the supports are carried through the enclosure 1. The heating of the sleeves is therefore regular and thus better controlled.

According to a specific embodiment, the framework 102 comprises two elements including a means for provisionally securing said elements together, the first element supporting the first series of diffusers and the second element supporting the second series of diffusers.

Thus, the framework 102 can be removed from the base 10 as a unit and then separated into the two elements thereof. It is therefore possible only to modify a part of the diffusers by securing, for example, the first element with a new second element supporting another series of diffusers. The facility according to the invention is therefore particularly modular. Moreover, when changing the supports to be carried through the enclosure 1, it is easy to replace the diffusers of a single series with other diffusers that are better suited to heat-shrinking the sleeves onto the new supports. It is therefore easy to perform asymmetrical heat-shrinking for containers that comprise different surfaces by judiciously selecting the first element and the second element.

According to a specific embodiment, the various diffusers are secured in a removable and adjustable manner to the framework 102.

Thus, it is very easy to change or adjust all or part of the diffusers. It is therefore not necessary to change the means for heating by steam 100 systematically, only certain diffusers, for example when only certain diffusers are faulty. The facility according to the invention is therefore even more modular. Moreover, when changing the supports to be carried through the enclosure 1, it is possible and easy to replace all or part of the diffusers in the enclosure 1 with other diffusers and/or to position all or part of the diffusers differently in order for the diffusers to be as closely suited as possible to the heat-shrinking of sleeves onto the new supports.

Here, each arch 104 supports, on one of the uprights 105a, a diffuser of the first series and, on the other upright 105a, a diffuser of the second series.

Here, each diffuser is secured to the associated arch 104 such as to be movable along the associated upright 105a. The diffuser can therefore be positioned at different heights in the enclosure 1.

Each diffuser herein is also secured to the associated arch 104 such as to be movable about an axis of rotation that is substantially parallel to the associated cross rail 105b. The diffuser can therefore be positioned differently relative to the supports carried by the conveyor 2 while remaining extended along the conveyor 2.

According to a specific embodiment, each diffuser comprises a manifold 110 pierced with openings for diffusing steam and a pipe for carrying steam (not shown here) connected by one end to the manifold 110 and by the other end to the quick-connection means.

Thus, the manifold 110 has a shape that is particularly suited for extending along the conveyor 2 such that the steam-diffusion openings substantially form a line for continuously diffusing steam onto the sleeves along the length over which the supports are carried through the enclosure 1. The heating of the sleeves is therefore extremely regular and thus better controlled.

The manifold 110 and the carrying pipe are, for example, made of a composite or plastic material.

Thus, the manifolds 110 and the carrying pipes are very light, which makes it possible to provide a lightweight single unit. Moreover, in the prior art, the diffusers are made of metal. And yet, if the metal is not of high quality, it tends to rust, which can cause complete or partial obstruction of the diffusion openings and pollution of the steam that passes through said openings. The manifolds and the carrying pipes of the invention make it possible to overcome said drawbacks.

Here, each manifold 110 is secured to the arch 104 connected substantially at the centre of the manifold 110. According to a specific embodiment, each manifold 110 is secured to the arch 104 by a link enabling the adjustable positioning of same.

According to another aspect of the invention, the connection means comprises a first distribution housing 111 connected to the first steam-intake opening 101a and a second distribution housing 112 connected to the second steam-intake opening 101b. The manifolds 110 of the first series are all connected to the first steam-intake opening 101a via the first housing 111 and the manifolds of the second series are all connected to the second steam-intake opening 101b via the other one of the housings 112.

Here, the manifolds 110 of the first series are all connected independently from one another to the first housing 111, the first housing 111 enabling independent adjustment of the flow rate of steam supplied to each manifold 110, for instance by adjusting the opening of an adjustable-opening valve. Similarly, the manifolds 110 of the second series are all connected independently from one another to the second housing 112, the second housing 112 enabling independent adjustment of a flow rate of steam supplied to each manifold 110.

For this purpose, the first housing 111 and the second housing 112 each comprise a means for adjusting the respective flow rates supplied to each manifold 110.

The adjustment means herein comprises screw-needle assemblies each associated with one of the steam-distribution openings of the housing to which one of the manifolds is connected, each needle having a rounded profile and being movable by the associated screw in order to obstruct all or part of the associated distribution opening.

The screw-needle assemblies enable very fine adjustment of the flow rate of the steam distributed to each manifold 110. By comparison, in the prior art, adjustment is carried out by means of a flap which can only be open or closed.

Thus, it is very easy to adjust the flow rate supplied to each manifold 110 independently. Furthermore, when changing the supports to be carried through the enclosure 1, it is possible and easy to modify the flow rate of the steam supplied to all or part of the manifolds 110.

Ultimately, the facility according to the invention offers many opportunities for adjustment and complete or partial changing of the steam-diffusion means, which makes it possible to provide very fine adjustment of the diffusion of steam in the enclosure according to the type of support and/or sleeves carried.

In general terms, the facility will preferably be arranged such that the diffusers are distributed symmetrically on either side of the conveyor and in a regular fashion in the main chamber in order for the steam diffusion to be as uniform as possible in the main chamber.

Evidently, the means for heating by steam of the invention is not restricted to the described embodiment, and variations can be made to same.

In particular, the diffusion means can comprise a different number of diffusers. The diffusers may not comprise manifolds, but rather distribution nozzles. The diffusers can also be merely attached, without being adjustable and/or without being removable from the framework. Although it has been described herein that the diffusers are arranged on the framework on the uprights of the arches, the diffusers might be secured to the cross rails of the arches. In this case, said cross rails should be prevented from forming the abutment that defines the service position of the partition.

The framework might also comprise a different number of arches. The arches can have a shape other than that described, for example the arches might be circular.

The framework may not be separable into two separate elements and might instead form a single unit. If the framework can be separated into two separate elements, the framework might also be separable directly on the base in addition to being separable once removed from the base.

Now that the means for heating by steam 100 has been described in detail, a description will finally be provided of the means for generating water steam 1.

Figure 1:
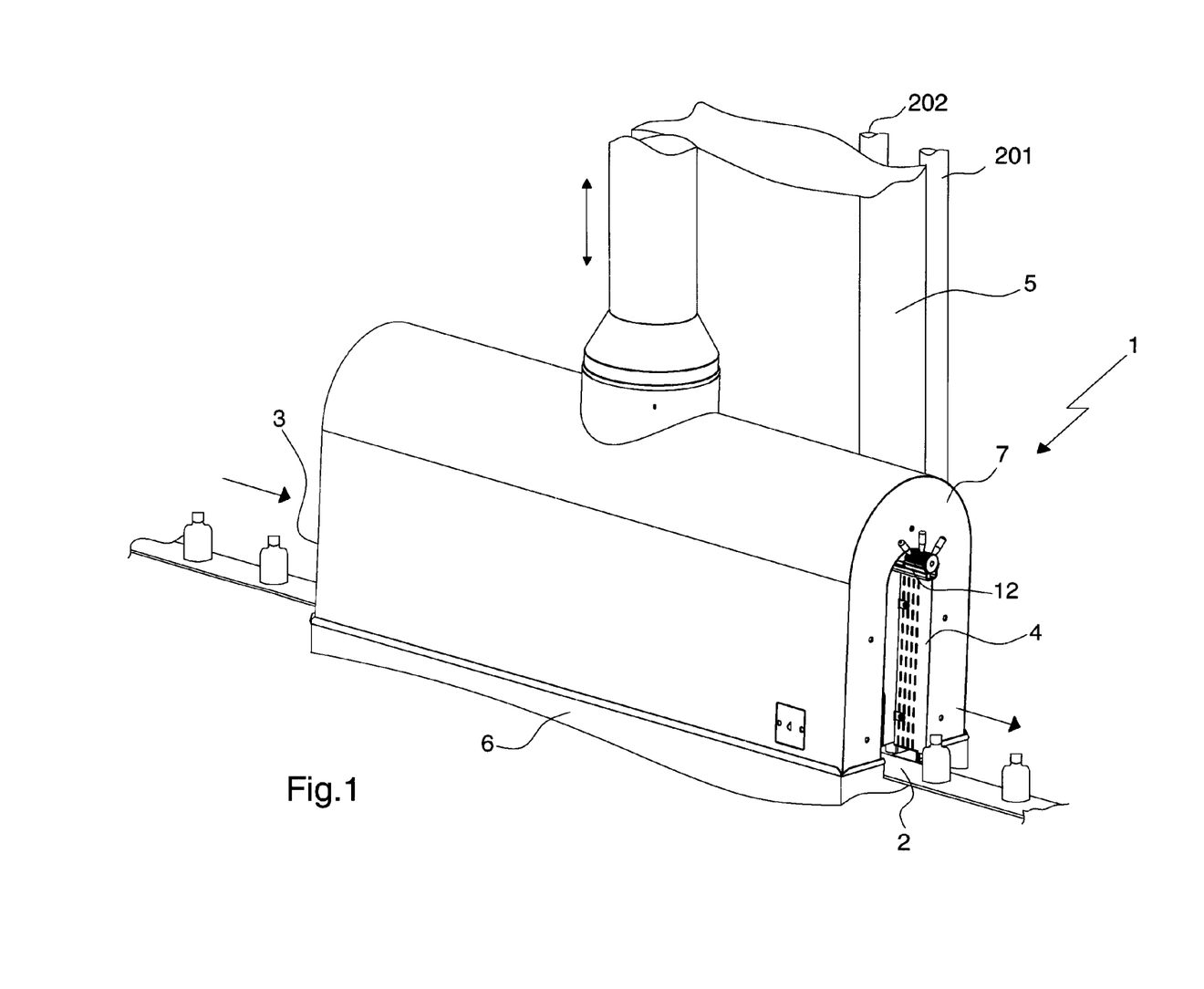
FIG. 1 is a schematic perspective view of a heat-shrinking facility according to the invention, with a hood of an enclosure of the facility depicted in operational position.
Figure 6:
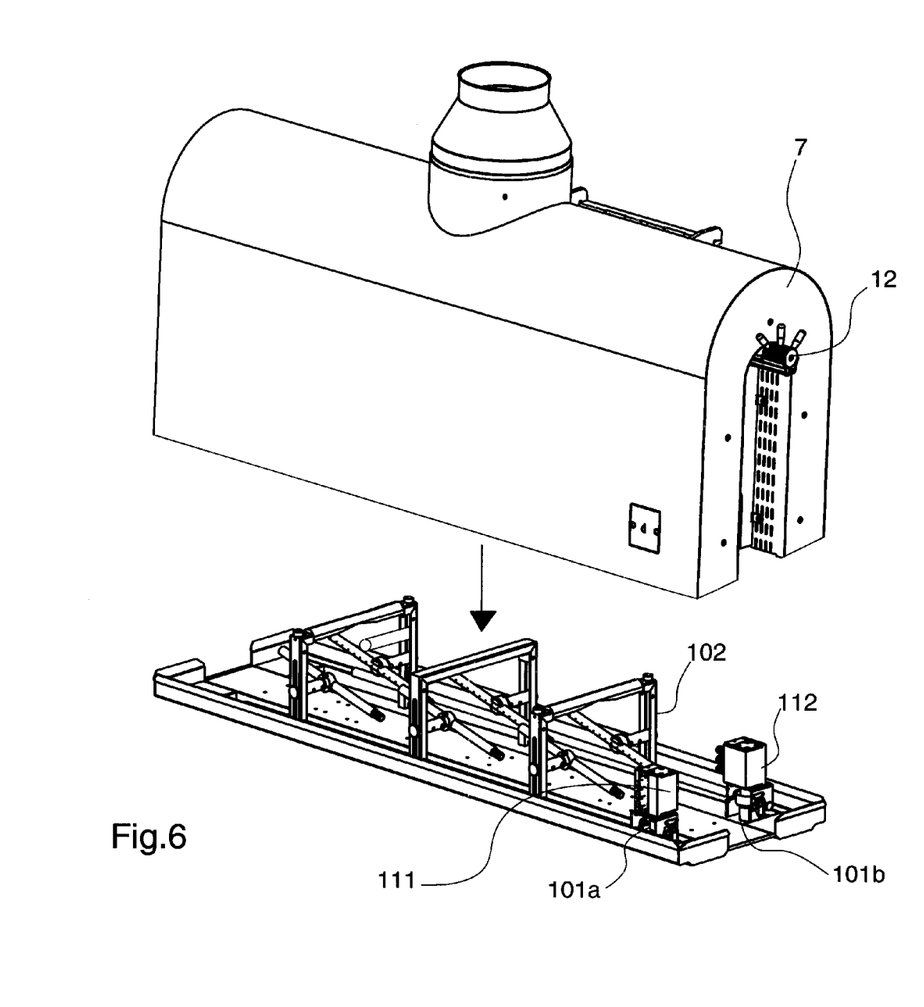
FIG. 6 is a schematic perspective view of a part of the heat-shrinking facility depicted in FIG. 1, with the hood depicted in open position.

Referring to FIGS. 1, 2 and 6, the enclosure 1 includes a hood 7 mounted mobile between an operational position in which the latter is sealingly mounted on the base 10 as depicted in FIG. 1, and an open position allowing access to the conveyor 2 as depicted in FIG. 6. Evidently, the hood 7 herein comprises two openings 3, 4 through which the conveyor 2 extends when the hood 7 is in operational position.

Thus, when the hood 7 is in open position, it is considerably easier to service the facility according to the invention than a facility of the prior art, in which the enclosure is a single block. In particular, it is much easier to work on the means for heating by water steam 100 or the conveyor 2.

The hood 7 herein is provided with at least one seal (not shown in the figures) which extends along the edges thereof opposite the base 10 and which, when the hood is in operational position, engages with the base 10 by resting thereon with high enough pressure to ensure a seal of the enclosure 1.

According to a specific aspect of the invention, the side walls of the hood 7 are connected by a top of the hood which has a rounded shape.

Steam tends to condense on the walls of the hood 7, which are often cold. The top of the hood 7 is therefore advantageously shaped such that the drops of water from condensation forming on the top of the hood 7 can flow along the side walls of the hood 7 towards the base 10 when the hood 7 is in operational position. Thus, the drops of water do not fall into the centre of the enclosure 1 and thus do not pollute the water steam or the supports during the heat-shrinking process.

Here, the facility comprises a means for moving the hood 7 between the retracted position and the open position which includes a vertical column 5 along which the hood 7 slides between the open position and the operational position thereof, as shown by the arrow. The open and operational positions herein are vertical to the base 10. Evidently, base is understood to refer to a base 10 which is substantially perpendicular to the ground on which the facility rests.

Thus, even when the hood 7 is in open position, the facility has reduced overall dimensions. In particular, the facility only takes up a very small amount of space on the ground. It is therefore very easy to move around the enclosure 1, which makes it even easier to service the base 10, the conveyor 2 or the means for heating by water steam 100. The movement of the hood 7 from one position to another thus does not disturb an operator placed next to the base 10.

In reference to FIGS. 1, 2, 5 and 6, according to a specific embodiment of the invention, the hood 7 comprises an inner partition 12 mounted mobile between a retracted position (as shown in FIGS. 1, 2, 5 and 6) and a service position in which the partition 12 defines with the side walls of the hood 7 and the base 10 a main chamber 11 of the enclosure 1 which is subjected to the action of the means for heating by water steam 100 when the hood 7 is in operational position. The partition 12 thus forms a roof of the main chamber 11.

Thus, thanks to the partition 12, it is no longer necessary to heat all the inside space of the hood 7, only the space of the main chamber 11. This makes it possible to reduce the power consumption of the means for heating by water steam 100 by reducing the space to be heated. Thus, by adjusting the service position of the partition 12, it is possible to adapt the volume of the main chamber 11 according to the type of support and/or sleeve carried.

According to a specific embodiment, the service position of the partition 12 is defined by the abutment of the partition 12 against the cross rail 105b of means for heating by water steam 104.

In this way, it is easy to define the service position of the partition 12 and also to define the space of the main chamber 11.

According to a specific aspect of the invention, the retracted position of the partition 12 is defined by the abutment of the partition 12 against the hood 7. Here, the partition 12 comprises a dome 13 on one surface of the partition 12 opposite the surface forming the roof of the main chamber 11. The dome 13 has a shape that complements the top of the hood 7. Thus, when the partition 12 is moved from the service position to the retracted position, the dome 13 abuts against the top of the hood 7 thus defining the retracted position of the partition 12.

Here, the movement means engages directly with the partition 12 in order to lift the latter such that when the partition 12 is moved from the service position to the retracted position, the dome 13 of the partition 12 abuts against the top of the hood 7 and thus drives the hood 7 from the operational position to the open position. Conversely, when the movement means lowers the partition 12, the hood 7 descends with the partition 12 until the operational position, the partition 12 continuing to descend until the service position thereof in abutment against the means for heating by water steam 100.

According to a specific embodiment, the partition 12 comprises three adjustable-opening valves 15a, 15b, 15c for sucking the steam in the main chamber 11 through the partition 12, which helps regulate the prevailing temperature in the main chamber 11 and prevents an excessive build-up of steam in the main chamber 11.

The valves 15a, 15b, 15c in this case are arranged at regular intervals along the partition 12 and are substantially centred on the partition 12. Thus, the steam is sucked into the main chamber 11 in a substantially uniform manner, which reduces the disruption to the atmosphere in the main chamber 11.

According to a specific embodiment, the three valves 15 are arranged on the partition 12 such as to be placed substantially above one of the arches 104 for extracting steam from the main chamber 11. Said valves 15 are therefore vertically adjacent to the diffusers and thus are particularly well arranged for extracting the steam since the concentration of steam is greater at the diffusers.

Here, the opening of each valve 15a, 15b, 15c can be adjusted independently. According to a specific embodiment, the openings of the valves 15 can be adjusted even when the hood 7 is in operational position. For this purpose, the partition 12 is provided with a means for adjusting valves 15a, 15b, 15c which comprises a rod 16 that extends along the entire partition 12 and through at least one of the openings of the hood 7 such that one end of the rod 16 is placed outside the hood 7. The rod 16 comprises a first pipe 16a which extends between the end of the rod 16 and a flap of the first valve 15a such that a rotation of the first pipe 16a relative to the partition 12 drives a rotation of the flap of the first valve 15a. The adjustment means also comprises a first lever 17a for positioning the first pipe 16a relative to the partition 12 which is supported by the end of the rod 16. Thus, the first lever 17a accessible outside the hood 7 makes it possible gradually to adjust the opening of the valve. Likewise, the adjustment means comprises pipes 16b, 16c and levers 17b, 17c respectively connected to the second valve 15b and to the third valve 15c.

According to a specific aspect of the invention, the partition 12 comprises a guard 24 extending along the edges thereof and tilted towards the base 10 when the partition 12 is in service position. Said guard 24 acts herein as a steam seal. Indeed, the guard 24 is shaped such that, when the partition 12 is in service position, the guard 24 allows drops of water to flow along the side walls of the hood 7 towards the base 10 but prevents the water steam from leaking out of the main chamber 11 towards the top of the hood 7.

This makes it easier to control the prevailing temperature in the main chamber 11 while still allowing the water to flow towards the base 10.

Moreover, if drops of water formed on the top of the hood 7 still fall without flowing along the side walls of the hood 7, the dome 13 makes it possible to prevent said drops from falling directly on the surfaces of the partition 12 or on the valves 15a, 15b, 15c. In addition, the rounded shape of the dome 13 promotes the flow of said drops, or of drops that form directly on the dome 13, towards the guard 24 which in turn promotes the flow of the drops towards the base 10 along the side walls of the hood 7.

In reference to FIG. 3, according to a specific embodiment, the base 10 comprises two symmetrical gutters 18 each extending on either side of the conveyor 2 and along the conveyor 2, the gutters 18 each comprising an opening 19 (only one of which is depicted here) connected to at least one outlet channel.

Since the steam tends to condense on the supports, which are often cold, the water from the heat-shrinking process is therefore advantageously discharged via the gutters 18. The gutters 18 herein slope towards the associated opening in order to facilitate the flow of the water.

The gutters 18 are preferably shaped such as also to receive the drops of water that flowed along the side walls of the hood 7 in order to promote the drainage of water from the enclosure.

In reference to FIG. 2, the enclosure herein comprises a first secondary chamber 20 and a second secondary chamber 21, the secondary chambers flanking the main chamber 11 and being each provided with a means (not depicted here) for sucking in the steam in the secondary chambers.

The hood 7 herein includes a first inner wall 22 and a second inner wall 23 which define, with the outer side surfaces of the hood 7 and with the base 10, the secondary chambers when the hood is in operational position. The first inner wall 22 and a second inner wall 23 also define the main chamber 11 with the base 10 and the partition 12. The partition 12 therefore moves only in the main chamber 11 such that the volume of the secondary chambers remains unchanged despite a movement of said partition 12.

The disclosed enclosure is not restrictive and variations can be made to same.

More particularly, the enclosure may not include a mobile hood and/or a mobile partition.

Although the hood in the depicted example is moved according to a vertical translation movement, the hood can generally be mounted mobile between the open position and the operational position according to a movement other than that described, such as, for example, by rotation.

The inner partition can be mounted mobile between the service position and the retracted position according to a movement other than that described, such as, for example, a rotation. Although herein the inner partition drives a movement of the hood, it is possible to make the hood drive a movement of the inner partition instead.

Likewise, although herein the partition comprises three valves for extracting steam, the partition may not comprise any valves or comprise a different number of valves. The valve or valves can all be adjusted at the same time.

Now that the enclosure 1 has been described in detail, a description will be provided of the water steam generation means.

Figure 7:
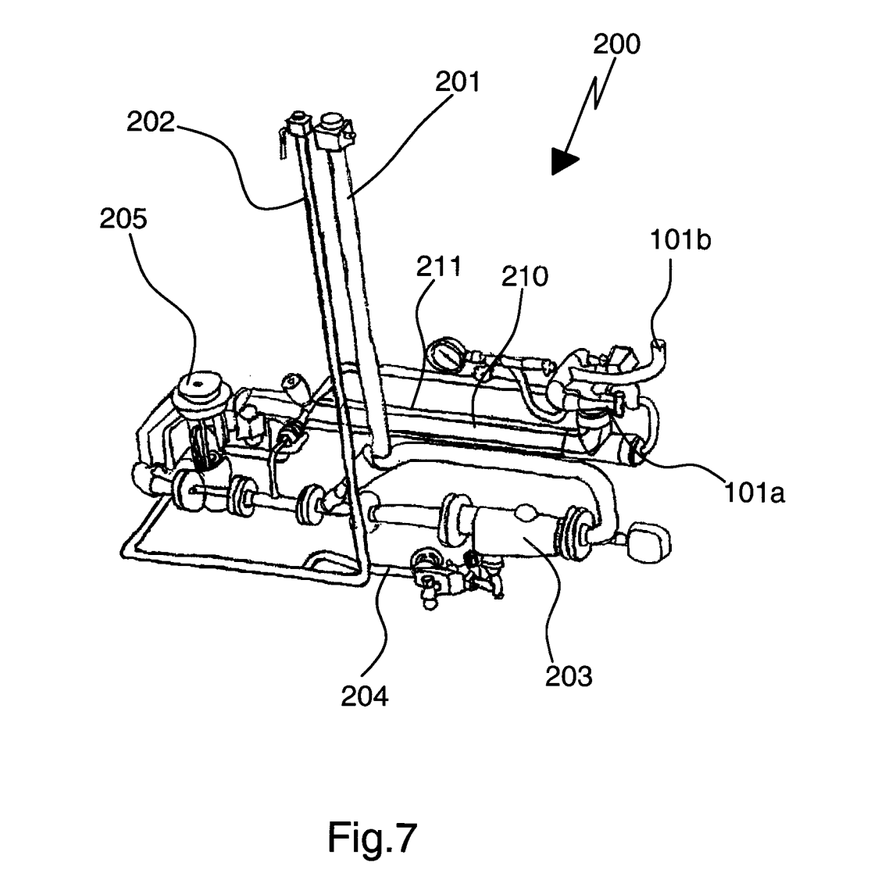
FIG. 7 is a perspective view of a heat-generation means of the heat-shrinking facility depicted in FIG. 1.

In reference to FIGS. 1 and 7, the means for generating steam 200 herein comprises a steam-carrying channel 201 which is connected to a boiler (not depicted here). The steam-generation means 200 herein also comprises a drainage channel 202.

According to a specific embodiment, the steam-carrying channel 201 and the drainage channel 202 both extend vertical to the facility and along the facility, the remaining generation means being arranged in the frame 6.

The steam-generation means thus takes up little space and does not disturb an operator placed in the proximity of the base 10, which further reduces the size of the facility compared with a facility of the prior art.

The steam-generation means herein comprises a gas/liquid separator 203 which is connected to the steam-carrying channel 201 and which is arranged upstream from the steam-intake openings 101a, 101b. A drainage channel 204 is connected between the gas/liquid separator 203 and the drainage channel 202 for evacuating the water from drying the steam.

Thus, the gas/liquid separator 203 makes it possible to dry the steam from the steam-carrying channel 203 and thus to improve the quality thereof. It should be noted that to ensure correct shrinking of the sleeve made of heat-shrinking material, the steam must be dry and must, in particular, have a temperature of the order of 100° to 130° at the area in contact with the sleeves.

According to a specific embodiment, the steam-generation means comprises an adjustable-opening valve 205 which is connected to the gas/liquid separator 203.

According to another aspect of the invention, the steam-generation means also comprises a means for overheating the steam before carrying same to the means for heating by steam 100, the overheating means herein being arranged between the valve 205 and the steam-intake openings 101*a*, 101*b*. The overheating means herein includes an overheating channel comprising an inner pipe 210 through which the steam flows and an outer pipe 211 concentric to the inner pipe 210 and covering the inner pipe 210.

Thus, the steam is reheated immediately before entering the enclosure 1, which makes it easier to manage the temperature distributed to the enclosure 1.

The overheating means, the gas/liquid separator 203 and the valve 205 thus make is possible to improve the quality of the steam received from the boiler before distributing same to the enclosure 1.

According to one aspect of the invention, the steam-generation means 200 comprises an adjustment means suitable for controlling the steam-generation means according to at least one measurement of the temperature prevailing in the enclosure 1 such as to make the measured temperature tend towards a given set temperature.

Indeed, it should be noted that the heating of a sleeve must be especially accurate in order for the sleeve to shrink correctly onto the support. By controlling the temperature directly inside the enclosure and not in the boiler, as in the prior art, the heating is regulated according to a measurement of temperature that is considerably more representative of the heating to which the sleeves are actually exposed, thus improving the heat-shrinking of the sleeves onto the supports.

Here, the adjustment means comprises a temperature sensor 212, as can be seen more clearly in FIG. 2, mounted in the enclosure 1 and capable of measuring a prevailing temperature in a predetermined area of the enclosure 1.

Preferably, the predetermined area is immediately next to a path of the steam coming out of the heating means.

Thus, the temperature measurement will be taken by the sensor 212 as close as possible to one of the areas for diffusing steam to the supports in order to obtain information that is as representative as possible of the heating to which the sleeves are actually exposed.

According to a specific embodiment, the sensor 212 is arranged such as to obtain information on the temperature of a jet of steam coming out of one of the diffusion openings of one of the manifolds 110. The sensor 212 herein is arranged along the upright 105*a* of one of the arches 104 above the associated manifold 110.

According to a specific embodiment, the predetermined area is next to the steam-diffusion area of the enclosure 1 for which the heat-shrinking of the sleeve is the most delicate, for example because of a specific shape of the support associated with the sleeve.

According to a specific embodiment of the invention, the sensor 212 can move inside the enclosure 1 such as to be capable of measuring a temperature prevailing in at least two different predetermined areas of the enclosure 1. The sensor 212 is, for example, removably secured to the enclosure 1. Thus, when seeking to measure the temperature in another area of the enclosure 1, an operator might remove the sensor 212 from one area in order to secure the enclosure 1 to another desired area.

It is therefore possible to adjust the steam-generation means according to a temperature reading that can be adapted, for example if a new type of support is travelling over the conveyor. The heating of the enclosure is therefore particularly well controlled, guaranteeing high-quality heat-shrinking of the sleeves onto the supports.

According to a specific embodiment, the steam-generation means 200 controls the valve 205 according to the reading of the temperature prevailing in the enclosure 1 by the sensor 212 in order to adjust the temperature inside the enclosure 1.

The temperature in the enclosure 1 is thus adjusted by controlling the flow rate of the steam supplied to the enclosure. The valve 205 therefore makes it possible to participate in adjusting the temperature inside the enclosure.

Evidently, the described steam-generation means is non-exhaustive and subject to variation.

The steam-generation means may not include an overheating means or a gas/liquid separator means or even an adjustable-opening valve.

The steam-adjustment means might comprise other temperature sensor arrangements for measuring a temperature inside the enclosure. For example, the adjustment means might comprise a different number of sensors. A sensor might be movable automatically in the enclosure, not manually. For this purpose, the adjustment means might comprise a means for moving the sensor from one area to another when in service. The enclosure might then remain closed even when seeking to measure the temperature in another area of the enclosure. The adjustment means can comprise a plurality of temperature sensors mounted in the enclosure and capable of each measuring a temperature prevailing in a different predetermined area of the enclosure, the adjustment means comprising a means for selecting only one of the temperatures measured by the sensors in order to control the steam-generation means. Thus, the sensors do not need to be moved manually or automatically in order to measure a temperature of the enclosure in another area of the enclosure, instead merely selecting another sensor. Moreover, the enclosure might remain closed even when seeking to measure the temperature in another area of the enclosure. At least one of said sensors might also be moved inside the enclosure such as to be capable of measuring a temperature prevailing in at least two different predetermined areas of the enclosure.

Although the sensor herein is arranged on a arch of the framework, the sensor might be arranged differently in the enclosure, for example arranged on the inner partition.

Regardless of the arrangement of the sensor or sensors, the predetermined area or areas will be preferably be immediately next to a path of the steam coming out of the heating means.

The adjustment means might control the steam-generation means according to information other than the temperature in the enclosure, such as, for example, according to information concerning the pressure or temperature at the steam-intake openings or even according to a measurement of the pressure in the boiler.

Figure 8:
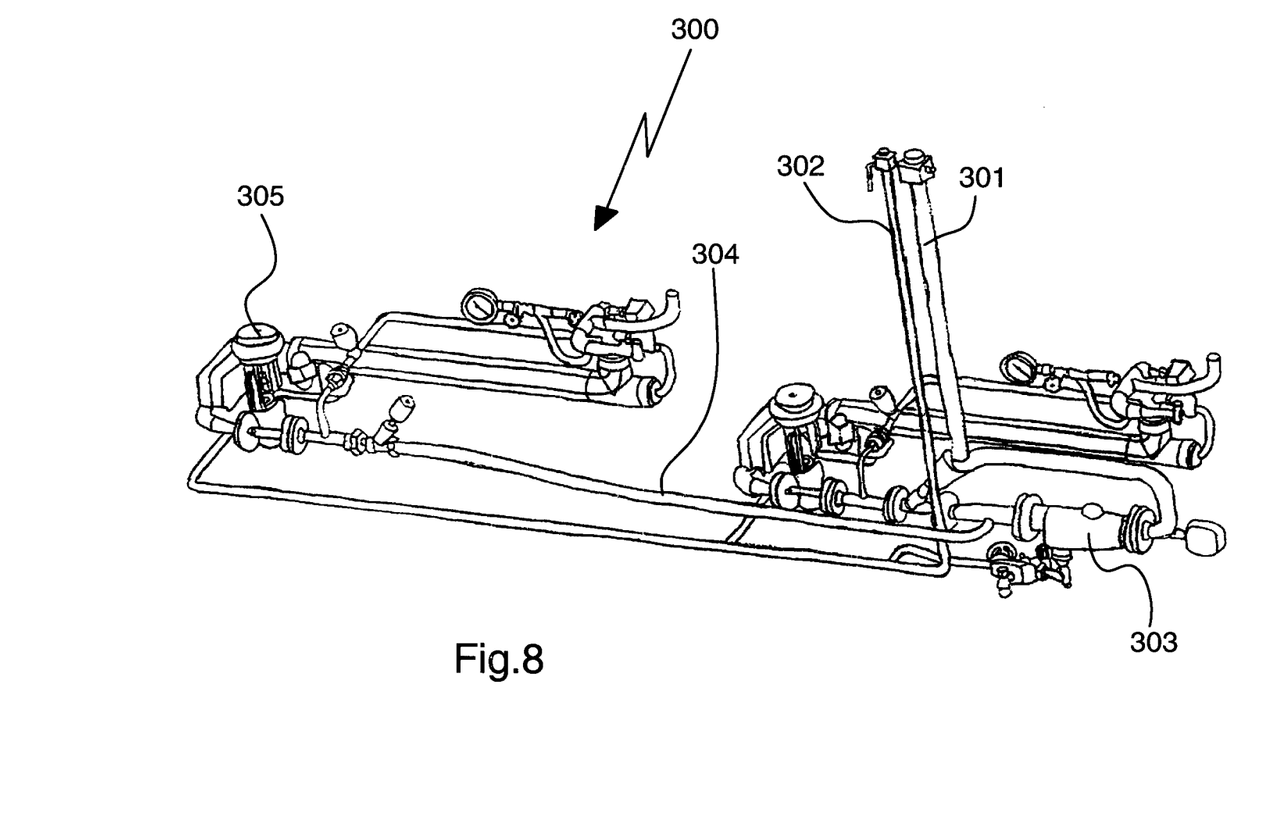
FIG. 8 is a perspective view of a heat-generation means of a heat-shrinking facility according to another embodiment of the invention.

Although it has been described that the facility only comprises a single conveyor, the facility might comprise two conveyors for carrying two different or identical types of supports through two different enclosures. According to a specific embodiment, in reference to FIG. 8, the steam-generation means 300 therefore only comprises a single drainage channel 301 and a single steam-carrying channel 302, thus reducing the size of the facility. At the output of the gas/liquid separator 303, a transfer pipe 304 carries the dried steam to a second adjustable-opening valve 305 which is connected to an overheating means in turn connected to steam-intake openings leading into the second enclosure, the second valve allowing the temperature in the second enclosure to be adjusted according to a temperature measurement taken in the second enclosure.

Although herein the valves for extracting steam from the inner partition are controlled manually, said extraction valves might also be controlled, for example controlled by the adjustment means.

The facility might also comprise a means for recycling the water discharged via the gutters of the base. The water might, for example, be discharged via the drainage channel of the steam-generation means.

The steam-generation means might comprise a different number of steam-intake openings.

The enclosure, the means for heating by steam and the steam-generation means have thus been described in detail. As can be observed, the facility according to the invention is extremely modular and offers an operator many possibilities for adjustment according to the heating and heat-shrinking that the operator would like to achieve. Moreover, the facility is small and takes up little space on the ground. In addition, the facility enables very easy servicing of the inside of the enclosure thanks to the mobility of the hood. Furthermore, the facility enables the steam consumption of the means for heating by steam to be considerably reduced thanks to the options for adjusting the diffusers and the means for heating by steam in general, as well as to the inner partition of the hood.

Thus, the invention allows a plurality of variations. Evidently, the enclosure, the heating means and the steam-generation means are three different aspects of the facility according to the invention. It is obviously possible only to implement the enclosure of the invention without implementing the other two aspects.

Thus, although the heat-diffusion means herein is a means for heating by steam, another type of heat-diffusion might be used that also comprises a means for quick connection to a heat-generation means leading into the enclosure. Such an electric heating means includes, for example, infrared elements attached to side walls of the enclosure and/or of the hood such as to extend on either side of the conveyor, the infrared elements being connected to a source of electric current.

While the present invention has been illustrated and described with respect to a particular embodiment thereof, it should be appreciated by those of ordinary skill in the art that various modifications to this invention may be made without departing from the spirit and scope of the present.

What is claimed is:

1. A facility for heat-shrinking sleeves made of a heat-shrinkable material inserted onto supports, such as containers, comprising:
    an enclosure,
    heat-diffusion means arranged in the enclosure,
    at least one conveyor for carrying the supports through the enclosure between an intake of the enclosure and an output of the enclosure,
with the facility being characterized in that the heat-diffusion means form a single unit removably mounted on the base of the enclosure, with the heat-diffusion means including a means for quick connection to a heat-generation means leading into the enclosure.

2. The facility according to claim 1, wherein the heat-diffusion means is a means for heating by steam which comprises a quick-connection means which is capable of sealingly engaging with at least one steam-intake opening being arranged in the enclosure.

3. The facility according to claim 1, wherein the heating means is attached on the base by the quick-connection means only.

4. The facility according to claim 2, in which the heat-diffusion means includes:
    a framework which support the quick-connection means, and
    steam-diffusion means which comprises at least one diffuser which is removably and adjustably secured to the framework and which is connected to the steam-intake opening by the quick-connection means.

5. The facility according to claim 4, wherein the diffuser comprises a manifold pierced with openings for diffusing steam, the manifold being secured to the framework such as to extend substantially along the conveyor, and a pipe for carrying steam connected by one end to the manifold and by the other end to the quick-connection means.

6. The facility according to claim 5, wherein the manifold and the steam carrying pipe are, for example, made of a composite or plastic material.

7. The facility according to claim 4, wherein the quick-connection means comprises at least one distribution housing which is connected to the steam-intake opening, the steam-diffusion means comprises several diffusers which are all connected to the same distribution housing to be connected to the steam-intake opening.

8. The facility according to claim 6, wherein diffusers are all connected independently from one another to the distribution housing, said distribution housing comprising adjustment means for adjusting the respective flow rates supplied to each diffuser.

9. The facility according to claim 8, wherein the adjustment means herein comprises screw-needle assemblies each associated with one of the steam-distribution openings of the housing to which one of the manifolds is connected, each needle having a rounded profile and being movable by the associated screw in order to obstruct all or part of the associated distribution opening.

10. The facility according to claim 4, in which the heat-diffusion means includes:
    a first series of diffusers which are secured to the frame so that said diffusers can all substantially extend along a first side of the conveyor,
    a second series of diffusers which are secured to the frame so that said diffusers can all substantially extend along a second side of the conveyor opposite the first side.

11. The facility according to claim 10, wherein the framework comprises two elements including a means for provisionally securing said elements together, the first element supporting the first series of diffusers and the second element supporting the second series of diffusers.

12. The facility according to claim 10, wherein the quick connection means comprises two distribution housings connected to distinct steam-intake openings, with the two housings being placed on either side of the conveyor so that the diffusers of the first series can all be connected to one of the openings through one of the housings and so that the diffusers of the second series can all be connected to the other opening through the other housing.

13. The facility according to claim 4, wherein the frame includes two side rails each one extending along a different side of the conveyor and at least two arches, with each one being secured on each side rail so that the arches extend above the conveyor, with the diffuser being secured on one of the arches.

14. The facility according to claim 13, wherein the base of the enclosure includes feet for receiving the frame side rails, with the feet being placed on either side of the conveyor.

15. The facility according to claim 1, comprising a heat-generation means connected to the heat-diffusion means and a frame supporting the base, in which said heat-generation means is at least partially arranged, the facility also comprising a means for drying a return arm of the conveyor by hot air, said drying means being connected to a air-extraction means in the frame.

16. The facility according to claim 1, wherein the enclosure includes a hood mounted mobile between an open position allowing access to the conveyor and an operational position in which it is securely mounted on the base, the hood comprising two openings through which the conveyor extends when the hood is in operational position and comprises an inner partition mounted mobile between a retracted position and a service position in which the partition defines with side walls of the hood and the base a main chamber of the enclosure subjected to the action of the heat-diffusion means when the hood is in operational position, with the service position of the partition being defined by abutment of the partition against the heat-diffusion means.

\* \* \* \* \*